United States Patent Office 3,666,544
Patented May 30, 1972

3,666,544
METHOD OF TREATING COTTON FOR FIRE RETARDATION
William L. Kuechler, Jenkintown, Pa., assignor to Proctor & Schwartz, Inc., Philadelphia, Pa.
No Drawing. Filed Mar. 12, 1970, Ser. No. 19,107
Int. Cl. C09k 3/28
U.S. Cl. 117—137          5 Claims

ABSTRACT OF THE DISCLOSURE

The method disclosed comprises the steps of first exposing the individual pores or fibers of a material as much as possible, then dispersing a desired hygroscopic powder, e.g., urea-diammonium phosphate with a free-flowing, anti-caking agent such as precipitated silica, into thorough contact with the exposed fibers, humidifying the exposed fibers to dissolve the powder and penetrate the fibers, e.g., by a fog obtained by mixing steam with saturated ambient air, and finally drying and/or curing the penetrated fibers to give rise to the desired characteristic imparted by the penetrating solution such as fire retardation. The hygroscopic powder is prepared by drying the constituents prior to pulverizing to reduce the moisture content thereof to less than ten percent, circulating hot air during the pulverizing process, and adding a free-flowing, anti-caking agent before or after the pulverizing process.

BACKGROUND OF THE INVENTION (1) Field of the invention

This invention relates to the field of hygroscopic chemicals and, more particularly, their preparation and use as a powder in imparting desired characteristics to porous materials.

(2) Description of the prior art

Powder compositions such as vinyl chloride resin powder have been applied as a chemical agent (binder) to cellulosic and flammable fibers. These powder compositions, such as the vinyl chloride resin powder, have had fire retardant characteristics and have superficially imparted such to the fibers to which they have been applied. Aside from their teaching of powder technology as applied to porous, e.g., fibrous, materials with the inherent fire retardant characteristic of some, these compositions do not relate to the present invention.

Chemical treatments of porous, e.g., fibrous, materials to thoroughly impart characteristics thereto have been accomplished in the past principally by "wet" processes, i.e., chemicals in water solution. These treatments have resulted in the matting together of the fibers into a compressed, wet batt which has been difficult and costly to dry and which, in the textile field, has compacted the fibers so much that subsequent carding has been difficult. The latter problems have been eliminated to some extent in the textile field by the use of chemicals which have been dusted onto the fibers in dry, finely powdered form. The application of such powdered chemicals, such as resins et cetera has been done convevniently at the doffer comb of carding type equipment where the fiber is opened (exposed) and agitated and the powdered chemical is dusted onto the exposed fibers to reaily coat and adhere thereto. The principles of dust adhesion to fiber surfaces has become well-known and established through the development of pad-type dust filters for air cleaning. Once the powdered chemicals have been dusted onto the exposed fibers, applications of heat and/or solvent are required to soften or melt the powdered chemicals causing the chemicals to securely coat and adhere to the surfaces of the fibers.

However, in many cases such as imparting fire retardant characteristics to the exposed fibers, merely coating or adhering the powdered chemicals to the exposed fibers is not enough. It is requisite in such cases to dissolve the powdered chemicals sufficiently to allow penetration of the solution into the fibers because, obviously, by merely coating the fibers the chemicals could be scrubbed or worn away exposing fibers lacking the desired characteristic.

As stated preiovsuly, chemical penetration of fibers has been accomplished by "wet" processes. These processes have permitted penetration of the fibers by the solution to give rise to the desired characteristic such as fire retardation. However, as also stated previously, the "wet" processes have had many disadvantages. Although steaming and spraying moisture onto powdered chemicals have been attempted to obtain desired chemical penetration of the exposed fibers, it should be noted that steaming as implied by the term requires certain sealed, closed environment equipment requirements for vapor-liquid-thermal equilibrium, which in themselves make such operations unsatisfactory and spraying results in insufficient moisture contact because of the large droplet size needed for solution but the small droplet size needed for proper flow within the clump or web of fibers.

Because of the many disadvantages of the prior art with respect to obtaining desirable penetration of exposed fibers through the application of powdered chemicals or "wet" processes, the invention as set forth hereinafter provides a new powder technology approach for imparting desired chemical characteristics to fibers where chemical penetration of the fibers is required.

SUMMARY OF THE INVENTION

This invention is directed toward a method of preparing a hygroscopic powder and the use of such powder to impart certain characteristics to porous material.

As an example of the present invention, fire retardation of cotton fibres is accomplished by the application of a urea-diammonium phosphate-precipitated silica composition in powder form to opened, individualized cotton fibers with subsequent humidification, heating and/or curing of the resultant fiber. The powder composition is obtained by drying the constituents prior to pulverizing and then pulverizing under hot air circulation with the addition before or after of a free-flowing, anti-caking agent such as the precipitated silica. Other hygroscopic powders may be formed including combinations of ammonium chloride and ammonium sulfate, or ammonium sulfamate, each, of course, with a free-flowing, anti-caking agent such as precipitated silica.

It is therefore an object of the present invention to arrive at an effective ethod of chemically treating porous material. This and other objects, features and advantages of the present invention will become more apparent when reading the following description and claims.

DESCRIPTION OF THE PREFERRED EMBODIMENT

The prior art has established powder technology and its application to porous, e.g., fibrous, material by steam or spray dispersion. The use of steam permitted fiber penetration by the dissolved powders but required sealed environments maintaining a vapor-liquid-thermal equilibrium. The use of spray dispersions merely effected penetration of the surface fibers of a clump of fibers or a web but, because of the relatively large droplets which could not reach the interior fibers, provided an uneven distribution of the moisture to the powder with a resultant lack of the desired characteristics in the interior fibers. The alternative, of course, has been the "wet" processes which, although permitting penetration of the desired solutions throughout the fibers, resulted in substantial drying and processing problems.

The need, therefore, has existed for an improvement in powder technology which would eliminate the partial penetration resulting from spray dispersion techniques and the sealed environment requirement of steam techniques.

This need has been satisfied by the present invention which advances powder technology to permit utilization of powdered hygroscopic compositions in combination with a moisturizing technique requiring an environment for the exposed pores or fibers of ambient, saturated air in conjunction with a steam source. The ambient and steam interaction produces a condensation of extremely fine (low micron to sub-micron) droplets which reach substantially all of the individual pores or fibers of a clump of fibers or a web and enable penetration of the resulting powder-droplet solution into the individual fibers or throughout the web. Of course, this penetration of the present invention would not arise if the powder were not of a hygroscopic nature to permit its ready dissolution by the fine droplets of relatively low temperature.

Since the constituents of a hygroscopic powder are likely each in themselves to be of a hygroscopic nature, the problems of preparation of such a powder are acute because of the high, mutual solubility of such constituents in aqueous soltuion. Thus, an ambient environment will lead to absorption of moisture from the air and lead to the dissolving of the constituents to negate any powdered end result. In order to counteract the hygroscopic nature of the constituents or any one of them, it has been found that the drying of the constituents prior to pulverizing to reduce the water content thereof to less than about ten percent with the addition of about one-half to five percent by weight of a free-flowing, anti-caking agent before the pulverizing step, and then pulverizing the constituents into the desired powder under the circulation of hot air at a temperature of between about 150 to 250° F. results in a hygroscopic powder which may be dispersed onto exposed fibers and yet remain stable under contemplated ambient conditions until further activated by a subsequent humidifying step. As a modification of this hygroscopic powder preparation, it has also been found that the free-flowing agent may be added subsequent to the pulverizing process but this does not assure stability during pulverizing to the extent that the addition prior to the pulverizing does. Also, of course, by adding the free-flowing agent prior to pulverizing, the necessary particle size of the powder is assured to be more uniform.

With respect to the application of the powder to porous, e.g., fibrous material, it should be noted that complete opening and exposure of the pores (fibers) to the powder is desirable to accomplish proper results. Any conventional technique of opening the fibers prior to the dispersion of the powder is acceptable as long as the dispersion can in fact reach the individual pores (fibers) throughout the clump of fibers or web and adhere thereto.

Once the hygroscopic powder has been properly dispersed throughout the opened and exposed fibers, the steps of dissolution by humidification and drying and/or curing are initiated. Humidification is obtained by exposing the powder-fiber mixture to a fog which is caused by the introduction of steam to an ambient closed environment. Because of the temperature differential between the ambient and the steam, extremely fine droplets of moisture will condense from the stream. These droplets of low micron to sub-micron size, because of their minute size, contact the individual fibers throughout the clump or web and readily dissolve the hygroscopic powder adhering to the fibers with the resultant solutions penetrating the fibers thoroughly. The penetrated fibers are then dried under conventional principles and cured, if necessary, to arrive at the desired characteristic or characteristics imparted by the hygroscopic powder. Because of the penetration of the fiber by the solution imparting these characteristics, the fibers retain the characteristic throughout and are not susceptible to the loss thereof through succeeding process operations of wear. It should be noted that generally, because of the penetration and absorption of the solution by the fibers, the fibers increase significantly in volume to possibly offset at least part of the entire process cost because of the increased bulk directly resulting therefrom.

With the present invention stated above in general, we now refer to a specific example. Industry requirements as well as government regulations have tended toward fire retardant cotton batting. This batting typically consists of a blend of seventy percent of first cut linters and thirty percent of cotton wastes. A typical batting production line includes bale breakers, a blending conveyor, a picker and a willow from where the blend of linters and waste is fed to three or four garnetts and their corresponding lappers.

Chemical treatment of cotton batting in the past has been done principally by saturation processes and processes of the "cotton flote" type, with the same disadvantages of the "wet" processes previously discussed. The present application of fire retardant characteristics to cotton fibers to be used in batting or otherwise includes the use of urea (66% by weight) and diammonium phosphate (33% by weight) of known fire retardant capability in powder form to the opened fibers of cotton. The powder form includes a free-flowing, anti-caking agent, preferably precipitated silica (1% by weight). The latter agent assists in preventing dissolution of the urea and diammonium phosphate in themselves because of their known hygroscopic nature.

The hygroscopic powder having the above-mentioned constituents is prepared by first drying the urea and diammonium phosphate stock prior to pulverizing to reduce the moisture content thereof to less than ten percent and preferably in the order of five percent, then adding the free-flowing agent of precipitated silica in the order of one percent although a range of from about one-half to five percent may be considered. This mixture is then pulverized under the circulation of hot air in the temperature range of between about 150° to 250° F. but preferably around 225° F. to arrive at a uniform particle size of between 50 to 150 microns in diameter and preferably in the order of 100 microns. The free-flowing agent may be added as most recently stated but may be added subsequent to the pulverizing step in which case the agent should already be formed to the uniform particle size. The resultant powder is desirably maintained at room temperature in an environment sufficiently dry to preclude the dissolution of the powder by means of moisture readily absorbed from the environment.

The application of the hygroscopic powder to the fibers is preceded by the opening of the fibers as much as possible to obtain an adequate individual fiber exposure to adherence of the powder once dispersed into the fiber stock. To obtain the needed exposure and individualization of the fiber stock, the cotton fiber may be processed on a conventional shredder of the type sold by Proctor & Schwartz, Inc. having Model No. 170. This shredder should preferably be modified to replace the vibrating comb with a rotary wire roll to result in an individualized fiber take-off instead of a web-like one. The roll, preferably of rigid V-wire, is utilized to obtain desired powder-exposed fiber contact by introducing the hygroscopic powder to the fibers before the take-off from the doffer (where the doffer carries the porous, e.g., fibrous, material on its top) and by substantially reducing powder fly. With the powder introduced to the fiber processing system at the shredder as modified so that it initially contacts the fibers prior to take-off, the final contact of the powder with the individually exposed fibers from the shredder is very substantial. This substantial contact now permits the effective utilization of the hygroscopic nature of the powder to obtain thorough penetration of the fibers with which the powder is in adhering, coating contact.

Penetration of the fibers by the hygroscopic powder is obtained subsequent to their take-off from the doffer of the shredder by exposing the fibers which have now been superficially coated with the powder to a humidified atmosphere. Moisture is presented to the opened fibers coated with the powder in a closed (but not necessarily sealed) environment through the introduction of steam to a saturated ambient at a significant temperature differential. The temperature differential causes a condensation of droplets of moisture (low micron to sub-micron size) which, because of their size, are to flow within the clump of fibers (or a web if such is the application) to be absorbed by the hygroscopic powders, dissolve same and, as a solution therewith, penetrate the fibers to impart thereto its fire retardant characteristic. The ambient is at a temperature of about 125–200° F. and preferably at about 150° F., with about five to ten pounds and preferably about seven pounds of the resulting "fog" per pound of fiber needed to obtain the desired result.

Once the solution of powder in water penetrates the fibers throughout, the fibers are run through conventional drying aparatus preferably of the conveyor type. This drying step is carried out in an air temperature range of between 150 to 250° F. to reduce the moisture content below about ten percent.

Depending on the constituents of the powder, the fibers may be cured subsequent to drying in any of a number of conventional apparatus. In any event, it should be noted that the porous, e.g., fibrous, material subsequent to drying will be substantially increased in volume because of the penetration, drying and/or curing of the solution of powder and water therein and will thus result in an additional benefit, possibly offsetting part of the process cost by the increased volume.

Although the terms "pore" and "fiber" and their derivatives are used interchangeably herein, the term "pore" is intended to be generic to the term "fiber" and, thus, is intended to encompass non-fibrous but porous materials such as concrete.

Since the preferred embodiment may be modified in numerous ways within the scope of the present invention as is shown by the example above, the preferred embodiment should be viewed as illustrative and not in a limiting sense.

What I claim is:

1. A method of treating cotton for fire retardation comprising the steps of exposing the pores of said cotton, dispersing a hygroscopic powder on said cotton, mixing said cotton and powder to increase the contact therebetween about said pores, moisturizing the powder-cotton mixture so that a solution of the powder is formed which penetrates said pores and reducing the moisture content of said cotton to less than ten percent by weight.

2. The method set forth in claim 1 wherein said hygroscopic powder is a mixture of urea-diammonium phosphate-precipitated silica.

3. The method set forth in claim 1 wherein the step of moisturizing comprises introducing steam to the ambient surrounding said powder-cotton mixture.

4. A method of treating cotton for fire retardation with a powder formed from at least one hygroscopic stock constituent comprising the steps of reducing the moisture content of said at least one constituent, adding a free-flowing constituent, pulverizing said constituents while exposing said constituents to a controlled environment, exposing the pores of said cotton, dispersing said hygroscopic powder on said cotton, mixing said cotton and powder to increase the contact therebetween about said pores, moisturizing the powder-cotton mixture so that a solution of the powder is formed which penetrates said pores and reducing the moisture content of said cotton to less than ten percent by weight.

5. A method of treating cotton for fire retardation with a powder formed from at least one hygroscopic stock constituent comprising the steps of reducing the moisture content of said at least one constituent, pulverizing said at least one constituent while exposing said at least one constituent to a controlled environment, adding a free-flowing constituent, exposing the pores of said cotton, dispersing said hygroscopic powder on said cotton, mixing said cotton and powder to increase the contact therebetween about said pores, moisturizing the powder-cotton mixture so that a solution of the powder is formed which penetrates said pores and reducing the moisture content of said cotton to less than ten percent by weight.

References Cited

UNITED STATES PATENTS

| | | | |
|---|---|---|---|
| 1,372,860 | 3/1921 | Bennett | 117—21 |
| 758,243 | 4/1904 | Goldman | 117—21 |
| 2,415,112 | 2/1947 | Seymour et al. | 117—137 |
| 2,815,761 | 12/1957 | Shearer | 117—16 |
| 3,027,267 | 3/1962 | Alleman et al. | 117—16 |
| 3,484,372 | 12/1969 | Birchall | 106—15 FP |
| 3,172,852 | 3/1965 | Lobos | 252—8.1 |

FOREIGN PATENTS

| | | | |
|---|---|---|---|
| 986,475 | 3/1965 | Great Britain | 117—16 |

WILLIAM D. MARTIN, Primary Examiner

R. M. SPEER, Assistant Examiner

U.S. Cl. X.R.

117—16, 21, 143 R